United States Patent [19]
Kelly

[11] Patent Number: 5,103,598
[45] Date of Patent: Apr. 14, 1992

[54] COATED ABRASIVE MATERIAL CONTAINING ABRASIVE FILAMENTS

[75] Inventor: Robert G. Kelly, Latham, N.Y.

[73] Assignee: Norton Company, Worcester, Mass.

[21] Appl. No.: 344,700

[22] Filed: Apr. 28, 1989

[51] Int. Cl.$^5$ .............................................. B24B 1/00
[52] U.S. Cl. ......................................... 51/295; 51/298; 51/309
[58] Field of Search ........................... 51/295, 298, 309

[56] References Cited

U.S. PATENT DOCUMENTS

| | | | |
|---|---|---|---|
| 4,225,321 | 9/1980 | Swiatek | 51/295 |
| 4,311,489 | 1/1982 | Kressner | 51/298 |
| 4,543,106 | 9/1985 | Parekh | 51/295 |
| 4,652,274 | 3/1987 | Boettcher et al. | 51/295 |
| 4,786,292 | 11/1988 | Janz et al. | 51/293 |
| 4,836,832 | 6/1989 | Tumey et al. | 51/295 |

Primary Examiner—William R. Dixon, Jr.
Assistant Examiner—Willie J. Thompson
Attorney, Agent, or Firm—David Bennett

[57] ABSTRACT

Coated abrasive products having abrasive filaments of polycrystalline alumina.

21 Claims, 9 Drawing Sheets

COATED ABRASIVE MATERIAL CONTAINING ABRASIVE FILAMENTS

TECHNICAL FIELD

This invention is directed to coated abrasive products in which the coated abrasive contains polycrystalline abrasive filaments.

BACKGROUND OF THE INVENTION

In general, alumina type abrasive material available until the recent past has been conventionally produced by high temperature smelting of bauxite or Bayer alumina. In such a process the abrasive material is manufactured in bulk form, in large pigs or concentrates. These abrasive pigs are first crushed on what is termed in the art, primary crushers, after which powerful jaw crushers then reduce the lumps to about ¾ inch size. Roll crushers then break up these small pieces into a usable range from the coarsest to the very finest particle sizes suitable for use in the manufacture of coated abrasive products. The crushed abrasive particles are then separated or screened into individual grades to conform to either CAMI (ANSI/ASC B74.18-1984) or FEPA grading standards. This is accomplished, in general, by passing them over a series of silk bolting cloth screens. These screens are carefully made from threads of exact size and number per square inch to insure extreme accuracy in the size of the apertures through which the abrasive particles are sifted. Mesh size of the screens can vary from 12 mesh (extra coarse) to 600 mesh (extra fine). Subsieve grades, called flours, are graded by hydraulic separators, air classifiers and levitating tanks. The sieve-size grades from the grading screens are regularly checked against standard industry grains. These grades are controlled to match the standard grains by testing on a series of standardized laboratory sieves; whereas flours are checked by a sedimentation method.

Both sieve grades and flours abrasive grains are given numerous treatments and rollings to remove surface contamination and dirt, to increase hardness, and to improve coating and adhesive characteristics. Accurate grading is, of course, all important to eliminate the possibility of damage that could be caused by oversized grains in a coated abrasive product and to provide maximum efficiency of abrasion.

The standards set for abrasive grains for use in the manufacture of coated abrasive products define grain size distribution, e.g. by indicating that the grain particles are larger than a certain size grade or grit, e.g. grade 50, or will pass through that size grade. Actually, the screens used in sizing coated abrasive grains only measure in two dimensions. Thus, abrasive grains that pass through a certain screen, e.g., grade 50, pass such because two of the dimensions of the three dimensional-shaped grain allow for such. Nevertheless an abrasive grain, because it is three dimensional, may be relatively short and stubby or long and skinny even though it passes through a certain grade. Thus, current manufacturing methods for coated abrasive material offer little control of the configuration of the individual abrasive grains used, other than that each has a strong or weak shape. Neither do they offer much control in the lengths of the grains for any particular grade, which can vary greatly. As a matter of fact, any particular grade of abrasive grains used in the manufacture of coated abrasives comprises a certain predetermined amount of overgrade, i.e., larger size, grains and undergrade, i.e., undersized or fines, grains. Thus, roll crushed grains conventionally used in the manufacture of coated abrasive material inherently provides a rather varying three dimensional configuration and a range of sizes for any particular grade. Moreover, because of the roll crushing to grade, there are fines that are necessarily produced that can not be used at all in the manufacture of coated abrasive products. As a result, where such fine abrasive material can not be reworked in the fusing process, such becomes waste, contributing to the overall cost of manufacture of the coated abrasive. Even where such fines are reworked in the fusion process, the fact that such fines are produced in the first place makes such manner of obtaining abrasive grains for use in the manufacture of coated abrasive products less efficient and economical.

Abrasive grains of the alumina type, as above-described, use in the manufacture of coated abrasive products suffer additional disadvantages. They also lack optimum toughness, hardness, and micro structure to achieve efficient grinding in many applications.

A problem which has heretofore been accepted as one of the inevitable characteristics of coated abrasive products is their short lives. Typical useful life times for coated abrasives are measured in minutes, and substantial time can be lost in removing a used-up disk or belt, for example, and replacing it with a new one. Anything which can substantially lengthen the useful life or a coated abrasive fulfills an important, long felt need. Another limitation experienced with known coated abrasive products is that the cutting rate of the product and the surface finish imparted to the work piece varies over the life of the coated abrasive. In general, a new coated abrasive product cuts relatively quickly but gives a relatively rough surface finish to the work piece. Over the life of the product, the cutting rate tends to drop gradually while the surface finish imparted to the workpiece tends to become finer. This makes it very difficult to obtain consistent results in coated abrasive grinding and finishing operations and necessitates the use of operators with more skill and know how than are easily available in many situations.

The heat generated in grinding with a coated abrasive can cause severe "burning" and other damage to the work piece. The heat build-up can be limited to acceptable levels by a combination of grinding at lower pressures against the work piece and by using a freer cutting coated abrasive that requires less applied power. In general, free cutting coated abrasives requiring less applied power and pressure for achieving a given cutting rate have important advantages.

The ability to grind well under low pressure conditions is also very important in applications such as hand held grinding applications such as in the grinding of body welds on automobiles where it is physically impossible or impractical to apply high pressure to the workpiece. In general, the term "low pressure grinding" is used herein to refer to hand held grinding or to grinding at pressures on the order of about 5 lbs./in$^2$ or less Sol gel, and particularly seeded sol gel aluminous abrasives have demonstrated substantial advantages over other premium abrasives in broad areas of coated abrasive applications since their introduction some few years ago. Such abrasives are generally made by drying and sintering a hydrated alumina gel which may also contain varying amounts of additives such as MgO or $ZrO_2$. The dried material is crushed either before or after sintering to obtain irregular blocky shaped polycrystalline abrasive grits in a desired size range. The grits may be later incorporated in abrasive products such as coated abrasive disks or belts.

U.S. Pat. No. 4,314,827 to Leitheiser et al. discloses abrasive grits made by such a method in which the sintered grits contain irregular "snowflake" shaped alpha $Al_2O_3$ crystals which are on the order of 5 to 10 microns in diameter. The spaces between the arms of a "snowflake" and between adjacent "snowflakes" are occupied by other phases such as a finely crystalline alumina magnesia spinel.

U.S. Pat. No. 4,623,364, which issued on Nov. 18, 1986 assigned to Norton Company, the assignee of this application, discloses a sol gel method for the manufacture of aluminous abrasive grits, and products other than abrasive grits such as coatings, thin films, fibers, rods or small shaped parts, having enhanced properties. In that patent the conversion of the hydrated alumina to alpha alumina is facilitated by the introduction of seed material into the gel or the gel precursor prior to drying. This can be accomplished by either wet vibrator milling of the gel or gel precursor with alpha alumina media, or by the direct addition of very fine seed particles in powder or other form. To make abrasive grits the seeded gel is dried, crushed and fired. The abrasive grits so produced may be used in the manufacture of products such as coated abrasive disks and grinding wheels. Alternatively, to make shaped parts or rods, the material may be formed or molded as by extrusion before firing. In the case of extrusion, the rods formed are later cut or broken into appropriate lengths.

U.S. Pat. No. 4,744,802, which issued May 17, 1988, also discloses a seeded sol gel process for producing alpha alumina based ceramics useful as abrasive grain and ceramic shaped bodies Such alpha alumina is obtained from alpha alumina monohydrate to which has been added a nucleating agent. Once the gel has formed, it may be shaped, according to the patentee, by any convenient method such as pressing molding or extrusion and then carefully dried to produce an uncracked body of the desired shape. If abrasive material is desired, the gel can be extruded or simply spread out to any convenient shape and dried. After drying, the solid body or material can be cut or machined to form a desired shape or crushed or broken by suitable means, such as a hammer or ball mill, to form abrasive particles or grains.

OBJECTS AND SUMMARY OF THE INVENTION

A primary object of the present invention is to provide coated abrasive having a longer useful life.

A further object of the invention is to provide coated abrasives requiring less applied power for a given cutting rate A still further object is to provide coated abrasives which are freer cutting and generate less heat during grinding .

A further object is to provide coated abrasives which maintain a high cutting rate with low applied power.

A further object is to provide coated abrasives which cut at a more even rate and impart a more consistent surface finish to the workpiece over its useful life.

In accordance with these and other objects of the invention there is provided a coated abrasive product in which the abrasive grain comprises sintered alpha alumina filaments having substantially consistent cross sections along their lengths. The filaments have an aspect ratio on the average of at least about 1:1, preferably at least about 2:1 and can be up to 12:1 or more. The alpha alumina filaments may contain additives such as MgO or other spinel alumina formers, $ZrO_2$, or other compatible materials They are preferably formed by the sol gel route and are preferably, but not necessarily, formed from a seeded sol gel.

The abrasive filaments are attached to a flexible backing proximate one end of the filament by an adhesive maker coat. The filaments extend generally away from the backing and are normally over-coated with size coat to further anchor them into the backing. The backing may be formed of any of the known backings used for coated abrasives, such as, for example, woven or stitch bonded fabrics, film or paper. A variety of well known cloth or paper finishing methods and materials are used in the industry to prepare the backing, depending on the application, and are equally applicable to the coated abrasive backings used in the present invention. Similarly any of the well known standard maker coats used in coated abrasive manufacture may be used.

If the aspect ratio of the abrasive filaments of the invention is fairly short, e.g. averaging at least about 1:1, preferably about 2:1 to about 5:1, the size coat may be applied by standard roll coating techniques. If the abrasive filaments have a longer aspect ratio it is preferred to coat by other means, such as spray coating, which will not squash down the filaments excessively The materials used for the size coating may also be of any of the known types used in the coated abrasive industry.

It has been found that the coated abrasives of the present invention have substantially longer lives than those incorporating the crushed grits of the prior art. They also tend to cut at a less variable rate and impart a less variable surface finish to the work piece over at least portions of their lives than do prior art coated abrasives.

Unexpectedly, it has also been found that the use of the coated abrasives of the present invention is particularly effective in low pressure grinding operations.

A unique advantage of the invention is that not only can coated abrasive products be provided having various length abrasive filament particles, as desired, but the size distribution for a particular application can be as exact or varied as desired, something not heretofore obtainable with roll crushed abrasive grain.

A further advantage is that coated abrasive products of the invention can incorporate abrasive filaments cut to a variety of lengths or aspect ratios, to simulate a standard CAMI graded filament blend. Alternatively, the coated abrasives can have a designed blend of over grade, control and fine diameter abrasive filaments.

Another advantage in the use of abrasive particles having a predetermined configuration in the manufacture of coated abrasive material is that such lends to a more economical and efficient overall manufacturing operation.

Most advantageously, however, is the fact that coated abrasive products according to the invention can be supplied, in various forms, e.g. abrasive discs, which offer improved performance in many grinding applications

BRIEF DESCRIPTION OF THE DRAWINGS

The foregoing and other objects and advantages of the present invention will become apparent upon the reading of the following description and the examples provided, taken in conjunction with the drawings, wherein.

DETAILED DESCRIPTION OF THE INVENTION AND THE PREFERRED EMBODIMENTS

Figure 1:
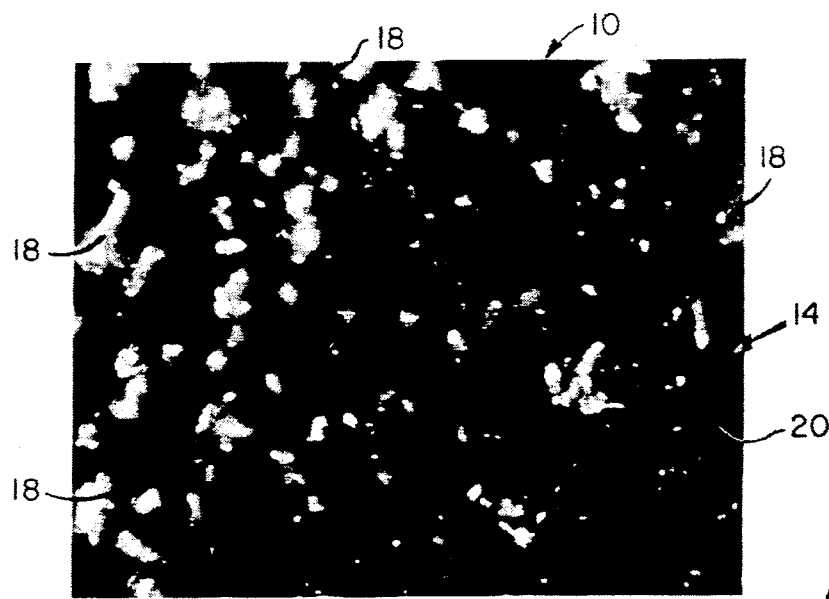
FIG. 1 is a photograph of a plan view of a portion of a coated abrasive product of the invention having a layer of abrasive filaments.
Figure 2:
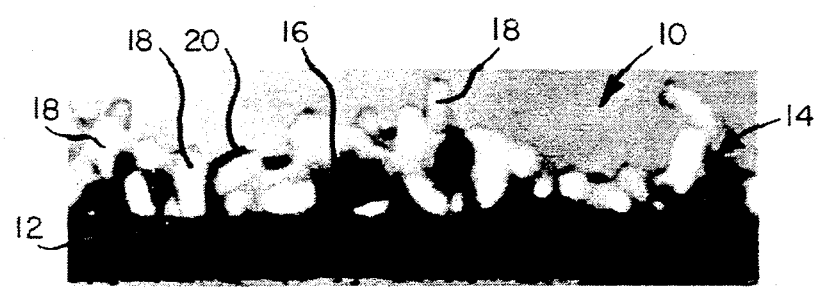
FIG. 2 is a photograph of a view in cross-section of a coated abrasive product such as shown in FIG. 1.
Figure 3:
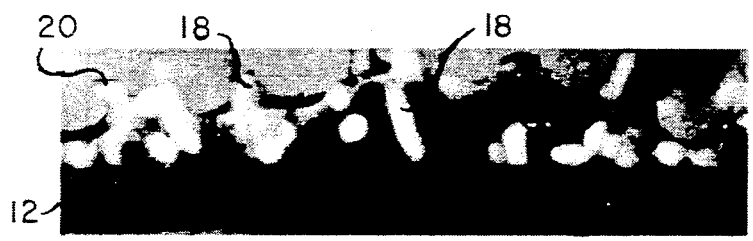
FIG. 3 is a photograph of a view in cross-section of another coated abrasive product of the invention in which abrasive filaments having a greater average aspect ratio than the product shown in FIG. 2 are used.
Figure 4:
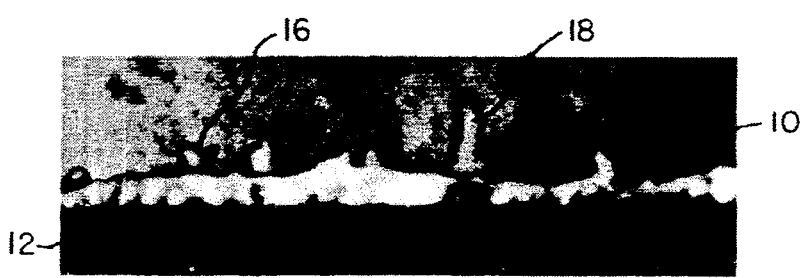
FIG. 4 is a photograph of a cross-sectional view of a coated abrasive product in which the abrasive filaments are of a somewhat lesser average aspect ratio than those in FIG. 2.

Referring now to the drawings, there is shown in FIG. 1 thereof a photograph of a coated abrasive product 10 comprising a backing member 12 and a top surface coating of coated abrasive 14. The coated abrasive 14, as will be better seen from FIG. 2, comprises a maker coat 16, a layer of abrasive filaments 18, and size coat 20.

For purposes of this application and the invention disclosed the terms "abrasive filament(s)" is used to refer to elongated ceramic abrasive bodies each having a generally consistent cross section along its length and wherein the length is preferably at least about twice (on average) the maximum dimension of the cross section. The abrasive filaments of the invention may be bent or twisted so that the length is measured along the body rather than necessarily in a straight line.

The abrasive filaments 18 are preferably obtained, in general, by extruding or spinning a preferably seeded gel of hydrated alumina into continuous filaments, drying the filaments so obtained, cutting or breaking the filaments to the desired lengths and then firing the filaments to a temperature of not more than 15000° C.

Various sol gel methods of preparation of gels of hydrated alumina are described in U.S. Pat. Nos. 4,314,827, 4,623,364, 4,744,802, and 4,797,139, all of which patents are incorporated herein, in total, by reference. In addition to the hydrated alumina, as disclosed in said patents, the sol may include up to 10-15% by weight of spinel, mullite, manganese dioxide, titania, magnesia, ceria, zirconia in the form of a powder or a precursor can be also added in larger amount, e.g., 40% or more, or other compatible additives or precursors thereof. In its most preferred embodiment, the sol or gel includes a dispersed submicron crystalline seed material or a precursor thereof in an amount effective to facilitate the conversion of the hydrated alumina particles to alpha alumina upon sintering. The amount of seed material should not exceed about 10% by weight of the hydrated alumina and there is normally no benefit to amounts in excess of about 5%. If the seed is adequately fine, amounts of from about 0.5% to 10% may be used with 1-5% being preferred. Examples of solid, microcrystalline seed materials are beta alumina, alpha ferric oxide, alpha alumina, gamma alumina, chromium oxide and other fine debris that will provide a nucleation site for the alpha alumina crystal being formed, with alpha alumina being preferred. The seeds may also be added in the form of a precursor such as ferric nitrate solution. In general the seed material should be isostructural with alpha alumina and have similar crystal lattice dimensions (within 15%) and be present in the dried gel at the temperatures at which the conversion to alpha alumina takes place (about 1000° to 11000° C.).

The green abrasive filaments may be formed from the gel by a variety of methods, such as by extrusion or spinning. Extrusion is most useful for filaments between about 0.010 and 0.06 in. in diameter which, after drying and firing, are roughly equivalent in diameter to that of the screen openings used for 100 grit to 24 grit abrasive grits, respectively. Spinning is most useful for fired filaments less than about 100 microns in diameter. Fired filaments as fine as 0.1 micron (0.001 mm) have been made by spinning in accordance with the invention. The green filaments shrink about 40% in diameter from their extruded diameter upon firing.

Gels most suitable for extrusion should have a solids content of between about 30% to about 65% and preferably between about 45% and 64%. The optimum solids content varies directly with the diameter of the filament being extruded, with about 60% solids content being preferred for filaments having a fired diameter roughly equivalent to the screen opening for a 50 grit crushed abrasive grit (about 0.28 mm).

Spinning in accordance with the invention may be performed by placing a quantity of the gel on a disk which is then spun to fling green filaments off, which dry almost immediately in the air. Alternatively, the gel may be placed in a centrifuge bowl having holes or slots drilled in its periphery of the size desire for the green filaments and the bowl is spun at, for example, 5,000 rpm to form the filaments. Other known spinning methods may also be used to form the green filaments. For spinning the most useful solids content is between about 20% to 45%, with about 35% to 40% being preferred.

If the filaments are being formed by spinning, it is desirable to add about 1% to 5% of a spinning aid, such as polyethelene oxide, to the sol from which the gel is formed in order to impart desirable viscoelastic properties to the gel for filament formation. The optimum amount of spinning aid varies inversely with the solids content of the gel. The spinning aid is burnt out of the filaments during calcining or firing. Since very little of it need be added (generally none at all for extrusion), it does not substantially affect the properties of the fired filaments.

Various desired shapes may be imparted to extruded gel filaments by extruding the gel through dies having the shape desired for the cross section of the filament. If the gel filaments are relatively large in cross section or have been made from a gel containing a large amount of water, it may be necessary or preferable to dry them at a temperature below 1000° C. for 24-72 hours before subjecting them to any heating above 1000° C. If the gel filaments have a relatively thin cross section or are made from very high solids gels, drying may not be necessary.

The initially formed continuous filaments are preferably broken or cut into lengths of the maximum dimension desired for the intended grinding application. In general, any shaping or partitioning operation needed to convert the continuous filaments into discrete bodies or to change their shape is best accomplished at the gel stage, or the dried stage because it can be accomplished with much less effort and expense at these points than by attempting to operate on the much harder and stronger bodies formed after final firing according to this invention. Thus, as the continuous filaments emerge from the extruder die, such may be reduced to the desired length filament by any suitable means known to the art, for example, by a rotating wire cutter mounted adjacent the face of the die. Alternatively, the dried filaments may be broken or lightly crushed and then classified to desired ranges of length.

After the gel filaments have been shaped as desired and cut or crushed, and dried if needed, they are converted into final form filaments by controlled firing. The firing should be sufficient to convert substantially all the alumina content of the gel filaments into crystalline alpha alumina, but should not be excessive in either temperature or time, because excessive firing promotes undesirable grain or crystallite growth. Generally, firing at a temperature between 12000° C. to 13500° C. for between one hour and 5 minutes, respectively. For filaments coarser than about 0.25 mm, it is preferred to prefire the dried material at about 400°-6000° C. from about several hours to about 10 minutes, respectively, in order to remove the remaining volatiles and bound water which might cause cracking of the filaments during firing. Particularly for filaments formed from seeded gels, excessive firing quickly causes larger grains to absorb most or all of smaller grains around them, thereby decreasing the uniformity of the product on a micro-structural scale.

The abrasive filaments of this invention should have an aspect ratio, i.e. the ratio between the length along the principal or longer dimension and the greatest extent of the filament along any dimension perpendicular to the principal dimension, of at least about 1:1, preferably at least about 2:1, on average. Where the cross-section is other than round, e.g. polygonal, the longest measurement perpendicular to the lengthwise direction is used in determining the aspect ratio. It should be appreciated, however, that the aspect ratio of a particular lot of abrasive filaments may vary depending somewhat upon the particular manner of partitioning of the filaments. Thus, a particular lot may have some filaments with aspect ratios less than 2:1 and some with more than 2:1; however, on average those abrasive filaments desired for use in coated abrasive products of the invention should preferably have an aspect ratio of at least about 2:1.

Preferably, the aspect ratio, on average, will range from about 2 to about 8, although longer filaments are also useful in many applications. In general, coated abrasive products having abrasive filaments of a lower aspect ratio will be found more suitable for high pressure grinding applications and those with filaments of a higher aspect ratio will be found more suitable in low pressure applications. The filaments most useful in the practice of the invention have a hardness of at least 14 GPa and preferably at least 18 GPa for most applications (Vickers indenter, 500gm load), and are preferably at least 90% and usually most preferably at least 95% of theoretical density. Pure dense alpha alumina has a hardness of about 20-21 GPa. In some instances, at least, the abrasive filaments used in the practice of the invention may have a twist in their lengthwise dimension, or be somewhat curved or bent.

The abrasive filaments of the present invention have been found to produce coated abrasive products that are far superior to the same type abrasive products containing normal crushed abrasive grain, even of the same material and microstructure and of equivalent diameter.

The manufacture of the coated abrasive products 10 of the invention can be accomplished, for the most part, by conventional techniques well known to those skilled in the art. The backing member 12 can be of any material now conventionally used in the manufacture of coated abrasives. This includes paper, film, wove and stitch bonded cloth, such as rayon, cotton drills, nylon and polyesters, vulcanized fiber, dimensionally stable polyester film and the like, sized with various materials depending somewhat upon the end use intended for the coated abrasive product. The sizing and filling materials for the backing member, if used, can be starch, glue, filled or otherwise as desired, or of a resinous material such as phenol-aldehyde.

The bonding layer or maker coat 16 can be of a resinous material such as , e.g., phenol-aldehyde, epoxy resin, and the like. This layer may have a sand size coat 16 thereover, if desired. Where the sand size coat is of a heat-hardened resinous material, the maker adhesive coat can be of either glue or resinous material, as desired.

An example of a conventional maker adhesive comprises a solution containing 48% phenol-formaldehyde resin solids and 52% calcium carbonate filler. Following coating of the maker coat on the backing member, the maker coat resin may conventionally be precured, for instance, for 30 minutes at 107° C., depending on the formulation. The abrasive filaments are then applied according to usual electrostatic techniques, upward propulsion or projection being preferred. This may then be followed by application of the size coat or adhesive, an example of which is a conventional solution containing 48% phenol-formaldehyde resin and 52% calcium carbonate filler. The coated abrasive is then given a final cure typically at about 107° C. for 10 hours, to cure the resin in the maker and size coats to the desired hardness.

Conventional radiation curable (E-beam or UV) resins used in the manufacture of coated abrasives may also be used on any or all of the cloth finishing or adhesive layers, if desired.

Coating of the adhesive coats onto the backing member, in general, is accomplished according to conventional coating techniques, e.g. roll coating. However, where relatively long abrasive filaments are used, the size coat may be more desirably applied by spray coating or other techniques than roll coating to avoid undue breakage or squashing down of the abrasive filaments.

Figure 5:
FIG. 5 is a photograph of a cross-sectional view of a coated abrasive product in which abrasive grains are used obtained by conventional roll crushing.
Figure 6A:
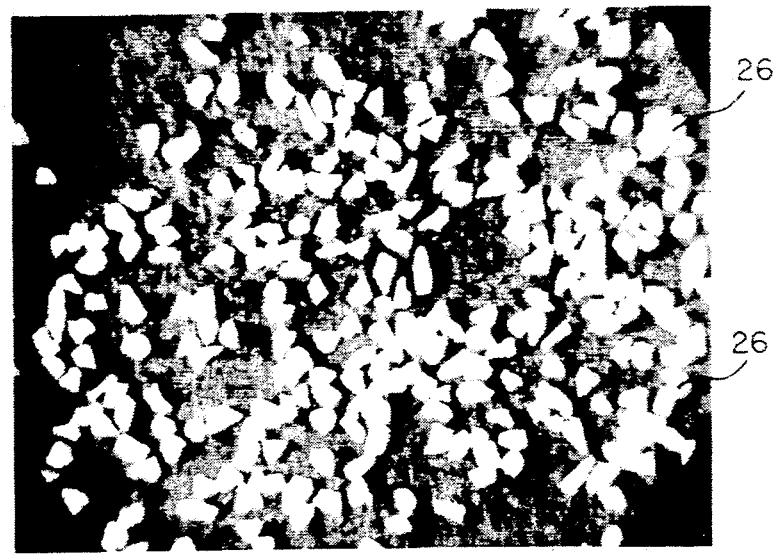
FIGS. 6(a), (b), (c), (d), (e), and (f) are photographs showing, respectively, 50 grit roll crushed sol-gel alumina abrasive grain conventional 50 grit roll crushed fused alumina abrasive grain; and 50 grit sol-gel abrasive filaments of random (c) and increasing (d,e,f) average aspect ratio used in the manufacture of coated abrasive products according to the invention.
Figure 6B:
Figure 6C:
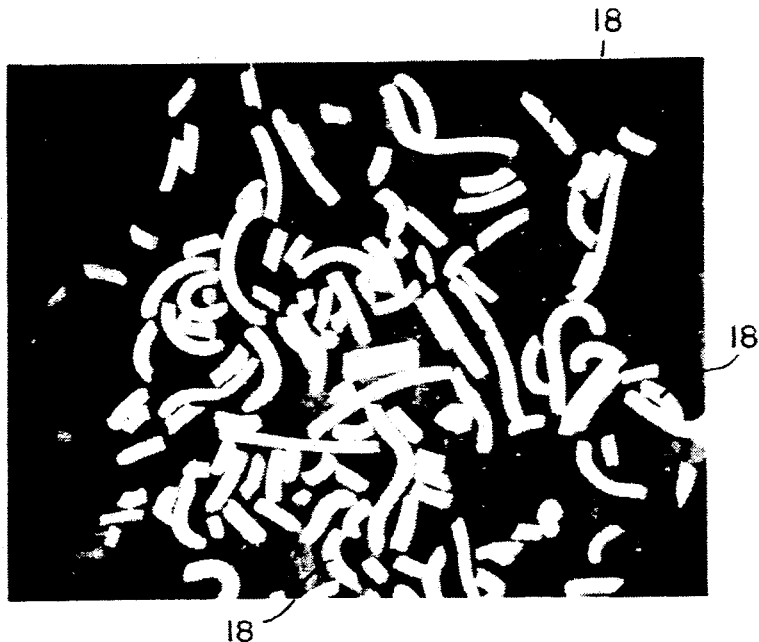
Figure 6D:
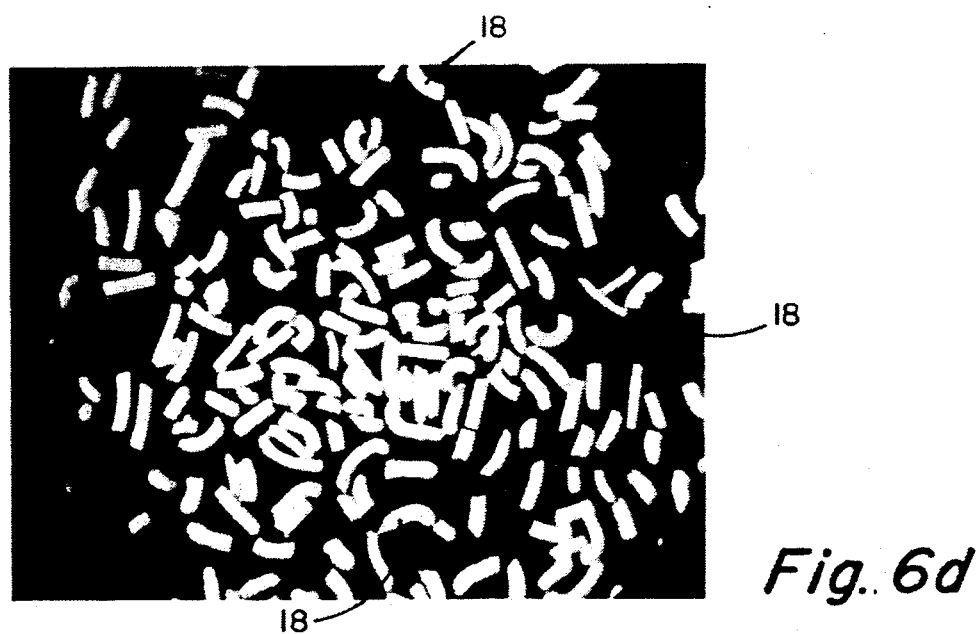
Figure 6E:
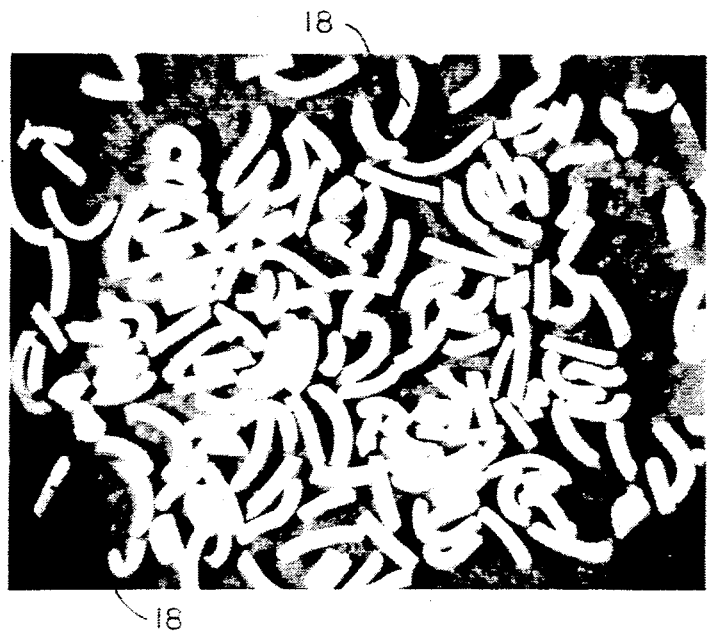
Figure 6F:
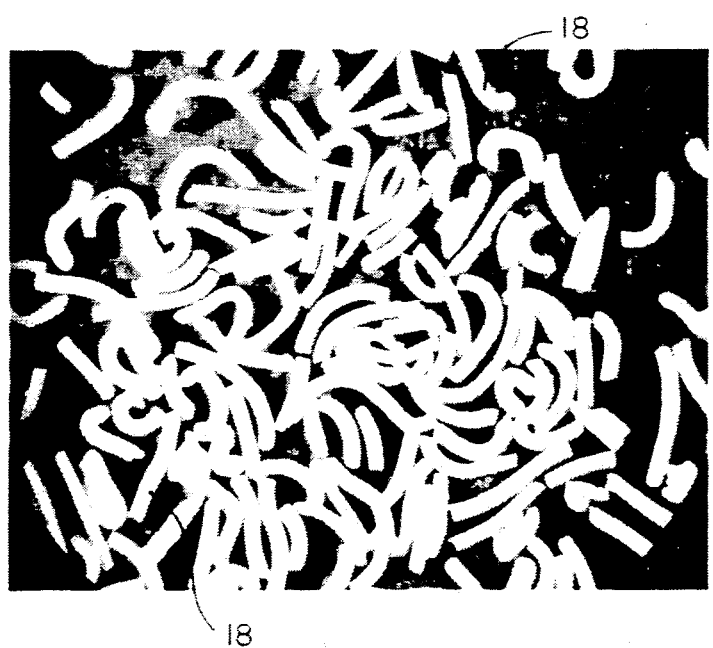

Turning now to FIG. 5 of the drawings, there is shown by comparison coated abrasive material 22 according to the prior art which comprises abrasive grains 24 obtained by conventional roll crushing techniques. One can readily appreciate the differences in construction offered by the coated abrasive material of this invention as shown in FIGS. 1-4. The differences in configuration of the abrasive filaments used in the manufacture or coated abrasive material of the invention can be more readily appreciated by reference to FIG. 6. In that figure, the irregular three-dimensional shaped grains 26 obtained by conventional roll-crushing of sol-gel alumina abrasive are shown in FIG. 6(a). These irregularly shaped grains are similar in shape to the fused alumina grains 28 shown in FIG. 6(b), obtained by conventional roll crushing techniques. In FIGS. 6(d-f) there are shown various lots of abrasive filaments used in the manufacture of coated abrasive material according to the invention. FIG. 6(c) shows a lot of abrasive filaments 18 of random aspect ratios, in which no effort was made to size grade the filaments. Such abrasive filaments have an average aspect ratio of 4.2:1. The abrasive filaments 18, in FIGS. 6(d), (e), and (f) have average aspect ratios of 3.6:1; 5.1:1, and 8.5:1, respectively. As can be readily appreciated from the drawings, the sol-gel abrasive filaments 18, have substantially consistent round cross-section along their lengths. On the other hand, the roll crushed sol-gel grains 26, like the roll crush fused alumina grains 28, are irregular in shape. Some are relatively long and others of block shape. None are deemed to have a consistent cross-sectional shape.

The following examples are illustrative of certain specific embodiments of this invention; however, these examples are only for purposes of better illustrating the invention disclosed herein and are not to be construed as limitations upon the invention.

EXAMPLE 1

Evaluation of Performance of Abrasive Filaments Against Roll Crushed Sol-Gel Alumina Grain In this example, coated abrasive discs comprising seeded gel ("S.G.") aluminum oxide abrasive filaments having an average diameter (0.013") approximately equal to 50 Grit CAMI grade (0.01369") were evaluated against seeded gel aluminum oxide abrasive grains obtained by roll crushing of the dried gel as conventionally done. The abrasive filaments were provided of varying lengths having aspect ratios varying from about 2:1 to about 12:1, in a manner somewhat analogous to the distribution of varying lengths of abrasive grain obtained by roll crushing and graded. Nevertheless, it should be appreciated that the abrasive filaments do not really lend themselves to such grading. In the case of abrasive filaments, contrary to conventional roll crushed grain, two of the dimensions of all the filaments are equal. The roll crushed gel material had a grit size distribution of +8.2+3.1.

Coated abrasive discs (7" dia., ⅞" central opening) were manufactured using conventional coated abrasive manufacturing procedures, conventional 0.030" vulcanized fibre backings and conventional calcium carbonate-filled resol phenolic resin make (48% resin, 52% filler) and size (48% resin, 52% filler) coats. The filler used in the size coat, however, was Cryolite, instead of calcium carbonate. The maker coat resin, following application of the abrasive filaments, was precured for 5 hours at 225° F. followed by a final cure, following size coat application, for 10 hours at 225° F. The coating was done using conventional roll coating techniques in a one pass operation with curing in a force air oven. The resin coating weights (wet basis) were as follows: maker coat, 15#/Rm; and size coat, 23#/Rm. A ream ("Rm") is equivalent to 330 square feet of coating area. The roll crushed abrasive grains and the filament-shaped abrasive particles were coated according to usual techniques, using electrostatic upward projection. The coating weights for the various discs tested are set forth in Table 1 below:

TABLE 1

Fiber Discs Characteristics For Test Evaluating Filament Shaped Abrasive Against Roll Crushed Grain

| Disc No. | Type Abrasive | Electrostatic Projection Time (Sec.) | Weight Abrasive (GMS.) |
|---|---|---|---|
| 1. | Roll Crushed S.G. (Control) | 5 | 52 |
| 2. | Extruded S.G. #645 | 5 | 65 |
| 3. | Extruded S.G. #645[1] | 20 | 84-87 |

[1]The normal grain electrostatic coating cycle time, i.e. for roll crushed grain, is 5 seconds. Nevertheless, after such a coating time (Disc No. 2) the coating was seen to be very open so a second sample (Disc No. 3) coated to 20 seconds was made and also tested.

The roll crushed abrasive grain (control product, Disc No. 1) was of the following standard composition:

| Component | Weight Percent |
|---|---|
| $Al_2O_3$ | 99.58 |
| $SiO_2$ | 0.12 |
| $Fe_2O_3$ | 0.03 |
| $TiO_2$ | 0.20 |
| CaO | 0.04 |
| MgO | 0.02 |
| $Na_2O$ | 0.01 |
| | 100.00 |

Other properties: density 3.89 (water Pyc), 3.88 (helium Pyc); hardness 20.7 (GPa); and avg. crystallite size 0.17 microns.

The abrasive filaments were of the same standard composition having an aspect ratio from about 2 to 12 (avg. Aspect Ratio 6-7) As indicated from the above data, the increase in projection time resulted in a significant increase in the weight of the coated grain.

The cured discs, after being cut to size, were first conventionally 0°-900° flexed to controllably crack the hard resin bond (maker and size coats), using a rubber roll flexer, and then were curl corrected, according to conventional techniques, after which they were used in tests conventionally performed in evaluating fiber discs for low (112 DsIII) and high (112 Dsh, 112 Dss) pressure dulling. In general, such tests involve mounting the abrasive disc on a medium hard rubber back-up pad which is, in turn, mounted to a horizontally disposed motor driven spindle assembly mounted on a carriage which is free to move in a horizontal direction on frictionless bearings inwardly toward and from a hydraulicly driven specimen holder. The specimen holder is adapted to accept either a 1"×1"×9¾"=¼" angle or a 3"×3/16"×15" long flat plate and moves horizontally in a direction 90° to the spindle, reciprocating back and forth at a predetermined rate of speed over a predetermined distance. The testing apparatus is mounted on a substantial steel table support providing stability during operation. The grinding force is applied by hanging a dead weight on a pully system attached to the moveable carriage on which the spindle (disc) is mounted. The disc is provided at an angle of 10° from parallel to the specimen holder.

Test 112 Dsh—is a high pressure (10 lbs. force 50 grit grain, 12 lbs.—36 grit) dulling test wherein the fibre disc is applied to grind the ¼" thick edge of a 1"×1"×9¾"—1018 carbon steel construction angle (¼"). The angle-shaped work piece is first weighed and then is mounted on the specimen holder which reciprocates back and forth over a distance of 9¾ inches at a rate of 8½ strokes/min. and a linear speed of 7 ft./min. The abrasive disc is driven at 3450 rpm. The grinding cycle is two minutes after which the angle specimen is removed and the loss of weight recorded. This cycle is then repeated with new angle specimens inserted as required until a minimum grinding rate of 10 grams/min. is reached. This ends the test. The data is recorded in grams (gms.) removed per two minute interval, member of intervals to test end, and total cut (gms.) removed by the disc being evaluated. The test results are usually shown as the per cent of a control disc.

Test 112 Dss—This test is identical to Test 112 Dsh except that the specimen is a 304 stainless steel angle, substituted for the carbon steel angle, the grinding interval is one minute, and the test end is 10 intervals. The grinding force, moreover, is 7 lbs. for 50 grit and 10 lbs. for 36 grit discs.

Test 112 DsIII—This test is similar to Test 112 Dsh except that it is a low pressure test—10 lbs. force—the specimen is a 3"×3/16"×15" long cold drawn carbon steel plate and such is adapted in the mount so that the fiber disc grinds the 3" face of the plate. The grinding interval is one minute, and the test is ended when the cut rate is less than 3 gms./min.

TABLE 2

| | | Evaluation of Performance of Fiber-Shaped Abrasive Against Roll Crushed Grain | | |
|---|---|---|---|---|
| | | TOTAL CUT (GMS.) | | |
| Disc No. | Type Abrasive | 112 Dsh 1018 STL ANGLE | 112 Dss 304 S.S. ANGLE | 112 DsIII 1018 STL 3" FLAT (LOT B) | 112 DsIII 1018 STL 3" FLAT (LOT C) |
| 1. | Roll Crushed S.G. 5 Sec. UP Coating | 618 | 50 | 117 | 365 |
| 2. | Extruded S.G. #645 5 Sec. UP Coating | 860 | 43 | 468 | 992 |
| 3. | Extruded S.G. #645 20 Sec. UP | 1192 | — | — | 937 |

TABLE 2-continued

| | | Evaluation of Performance of Fiber-Shaped Abrasive Against Roll Crushed Grain | | |
|---|---|---|---|---|
| | | TOTAL CUT (GMS.) | | |
| Disc No. | Type Abrasive | 112 Dsh 1018 STL ANGLE | 112 Dss 304 S.S. ANGLE | 112 DsIII 1018 STL 3" FLAT (LOT B) | 112 DsIII 1018 STL 3" FLAT (LOT C) |
| | Coating | | | | |

The low pressure test was carried out on two different lots of steel (Lot B and Lot C) received at different times. As indicated, they have different grinding characteristics as evident by the total cut given in Table 2.

The relative results of the above grinding tests with respect to the control disc, i.e. Disc No. 1, are shown in the following Table 3.

TABLE 3

| | | Relative Results of Cut Performance Of Filament-Shaped Abrasive Against Roll Crushed Grain | | |
|---|---|---|---|---|
| Disc No. | Type Abrasives | 112 DsH 1018 STL ANGLE | 112 Dss 304 S.S. ANGLE | 112 DsIII 1018 STL. 3" FLAT (LOT B) | 112 DsIII 1018 STL. 3" FLAT (LOT C) |
| 1. | Roll Crushed S.G. 5 Sec., UP Coating | 100% | 100% | 100% | 100% |
| 2. | Extruded S.G. #645 5 Sec., UP Coating | 139% | 86% | 400% | 279% |
| 3. | Extruded S.G. #645 20 Sec., UP Coating | 193% | —[1] | —[1] | 264% |

[1]These tests were not run due to limited number of abrasive discs made up.

It is clearly evident from the above results that on 1018 carbon steel, the fibre-backed discs having abrasive filaments therein have significantly better grinding performance than the discs having the Norton Company seeded gel aluminum oxide grains made by conventional crushing techniques. Disc No. 2 with 5 sec. UP coating gave 39% more cut in the high pressure test and from 179 to 300% more cut in the low pressure flat test. Further, increasing the amount of abrasive filaments (Disc No. 3) resulted in even further greater improvement in the cut at high pressures whereas no improvement was observed in the low pressure test. The overall results of this test indicate that abrasive filaments are more durable under high pressure grinding conditions. Such are also more versatile and freer cutting than roll crushed S.G. abrasive grains on 1018 carbon steel at low pressures.

The abrasive filaments used in this example were obtained according to the disclosure in Example III, in Application Ser. No. 07/345,139, filed by Charles V. Rue et al, of even date herewith entitled BONDED ABRASIVE-PRODUCTS CONTAINING SINTERED SOL GEL ALUMINA ABRASIVE FILAMENTS, the entire disclosure of which is hereby incorporated by reference. In general, however, the fibrous abrasive was made by mixing 3.2 kg PuralR NG aluminum monohydrate obtained from Condea Chemie GMBH, with 1.3 kg of milled water containing 22 g of alpha alumina seeds in a conventional double shell V-blender for five minutes to form a substantially uniform sol. At this point, 200 g of 70% nitric acid diluted with 750 cc distilled water was added and mixing continued for an additional five minutes to form a 59% solids gel in which the seeds were uniformly dispersed. The seeds used in the gel were prepared by milling a charge of distilled water in a model 45 Sweco mill with regular grade 88% alumina grinding me ia (each 12 mm diameter by 12 mm long) obtained from Diamonite Product Company, Shreve, Ohio, until the particulates (alumina seeds) in the water reached a specific surface area of at least 100M²/g.

The PuralR NG powder used had a purity of about 99.6% with minor quantities of carbon, silica, magnesia, and iron oxide.

The seeded gel was then conventionally extruded through a multiple opening smooth walled die whose openings were 0.60 mm in diameter to produce continuous gel filaments. After drying, the extruded strands were broken to lengths averaging about 2 mm then fired to 1320° C. for five minutes. After firing to convert the abrasive filaments to alpha alumina, the individual filaments had an average cross-sectional size equivalent to a standard 50 grit abrasive. At least some of the abrasive filaments were bent and twisted along their length.

The abrasive fibers were substantially pure alpha alumina with an average crystallite size of 0.3 microns, as above-mentioned, and a hardness of about 16 GPa.

EXAMPLE 2

Comparative Cut Performance of Abrasive Filaments Against Roll Crushed Grain

This example compares the cut and finish of filament-shaped seeded gel aluminum oxide abrasive particles against S.G. abrasive grain obtained by conventional roll crushing. The filament-shaped abrasive particles had an average diameter (0.013″) approximately equal to 50 grit abrasive grains (0.01369) and was of random aspect ratio varying from about 2:1 to about 8:1. Nevertheless, the batch grading used resulted in some very long fibers and a disproportionately high number of fines as belowed indicated. The composition of the abrasive filaments and the 50 grit S.G. roll crushed control was of the same standard composition as that set forth earlier in Example 1.

| Grain Type | Grading Results of Rolled Crushed Grain vs. Abrasive Fibers | | |
|---|---|---|---|
| | Serial No. | Grit | Grade |
| Roll Crushed | 08D168.3 | 50 | +3.2 + 1.9 |
| Abrasive Filaments | 08D168.7 | 50 | −2.5 + 30.9 |

As can be seen from the above table, the variation in the grading of the two different abrasive "grains" varied from one another considerably. The reading of "+3.2+1.9" means that the sample of the roll crushed abrasive grain was 3.2% high in overgrade and 1.9% high in fines, as tested using the CAMI grading screen system. Such is within the tolerance deemed allowable for 50 grit SG abrasive grain. On the other hand, the reading of "−2.5+30.9" for the sample of the abrasive filaments indicates that the sample was 2.5% low in overgrade and 30.9% high in fines a disproportionate value. The high reading on the fines end results from the abrasive filaments ("grains") all being of the same approximate diameter which is less than the size of the 50 grit control screen.

Fibre discs were prepared as before described in Example 1. The coating weights were approximately: maker coat 15 lbs./Rm; size coat 23 lbs./Rm, abrasive filaments 65 gms, roll crushed grain 52 gms.

The fibre discs made, after being conventionally flexed, were first evaluated in the low pressure dulling test (Test DsIII) earlier described. The results showing the comparative cut and finish are set forth in Table 4 below:

TABLE 4

Comparative Cut & Finish on 3″ Flat Plate For Filament-Shaped Abrasive Against Roll Crushed Grain

| | CUT | | | | FINISH | | | | | |
|---|---|---|---|---|---|---|---|---|---|---|
| | S.G. CONTROL 50 GRIT | | FILAMENT-SHAPED 50 GRIT | | S.G. CONTROL 50 GRIT SURFACE FINISH | | | FILAMENT-SHAPED 50 GRIT SURFACE FINISH | | |
| TIME INTERVAL No. | CUT/ INTERVAL GMS. | ACCUM. CUT GMS. | CUT/ INTERVAL GMS. | ACCUM. CUT GMS. | Ra | Rtm | Pc | Ra | Rtm | Pc |
| 1 | 29 | 29 | 20 | 20 | 164 | 1005 | 227 | 125 | 995 | 211 |
| 2 | 26 | 55 | 17 | 37 | 105 | 736 | 265 | 103 | 855 | 233 |
| 4 | 18 | 94 | 15 | 68 | 80 | 625 | 163 | 109 | 757 | 156 |
| 6 | 12 | 119 | 10 | 92 | 48 | 414 | 115 | 53 | 386 | 82 |
| 8 | 8 | 136 | 9 | 112 | 37 | 331 | 103 | 33 | 268 | 73 |
| 10 | 4 | 146 | 8 | 128 | 34 | 282 | 96 | 28 | 222 | 91 |
| 12 | — | — | 7 | 143 | | | | 28 | 193 | 92 |
| 14 | — | — | 5 | 154 | | | | 40 | 297 | 81 |

Ra = DEVIATION FROM MEAN LINE IN MICRONS
R = MEAN PEAK TO VALLEY HEIGHT IN MICRONS
Pc = NUMBER OF PEAKS

The finish quality of a metal workpiece is commonly measured by the Ra and Rt values taken from traces at various spots (e.g. at the center and at the left, right edges) along the finished piece. The meaning of these statistical parameters is well known to those skilled in the art. Such are clearly defined in a publication entitled "An Introduction to Surface Texture and Part Geometry" by Industrial Metal Products Incorporated (IMPCO), the complete disclosure of which is incorporated herein by reference. In general, Ra is a measure of average surface roughness. Since many surfaces of differing topography might yield similar Ra values, this number is usually supplemented by other parameters generated from the same surface. In the metal finishing art, Rt is often employed to supplement the Ra measurement. The value of Rt is a measure of the depth of gauges or scratches that might remain on the workpiece surface after the finishing operation. Pc is a number indicating, in general, the frequency of scratches.

As can be seen from the above data, the discs having the abrasive filaments therein out performed in cut the discs having conventional roll crushed abrasive grain. Initially, the abrasive filament disc cut at a somewhat lower rate for the first few intervals but then continued to cut at a sustained rate for a much longer time. The surface finish generated by the abrasive filaments appears about equal to that of the roll crushed grain. Nevertheless, it should be again pointed out that the batch grading of the filament shaped abrasive particles resulted in a disproportionately high number of fines, as above-disclosed and some very long abrasive filaments. With more controlled "grading", a different finish would likely result.

A further test (112 DsI) was conducted to provide a comparison to the cut and the finish generated by the abrasive filaments and both 50 grit and 36 grit roll crushed abrasive grain. The results are shown in the following Table 5. This test is the same as Test DsIII except that the test piece has a 1" face.

against roll crushed abrasive grain of similar composition, to evaluate the effect of aspect ratio on cut performance.

Seeded sol-gel abrasive material was manufactured as before disclosed and was then extruded through a fine round die having a plurality of openings. The abrasive filaments were dried and lightly jaw crushed to provide different abrasive filament lengths. After firing, the lot was then screened for a short time over varying screen openings allowing for separation of different lengths of abrasive filaments. The average aspect ratio was determined and is given below. The chemical analysis of the different samples and other physical properties are set forth in Table 6.

TABLE 6

| Sample Identity | | 1015[1] | 1016 | 1017 | 1018 | Control |
|---|---|---|---|---|---|---|
| Weight (lbs) | | 10 | 24 | 13.5 | 12.5 | 0.01 |
| Chemistry[2]: | $Na_2O$ | 0.01 | 0.01 | 0.01 | 0.01 | 0.02 |
| | MgO | 0.01 | 0.01 | 0.01 | 0.01 | 0.12 |
| | $SiO_2$ | 0.04 | 0.03 | 0.03 | 0.03 | 0.04 |
| | CaO | 0.02 | 0.02 | 0.03 | 0.02 | 0.20 |
| | $TiO_2$ | 0.17 | 0.17 | 0.21 | 0.18 | 0.03 |
| | $Fe_2O_3$ | 0.15 | 0.21 | 0.11 | 0.12 | 3.89 |
| Density: | Water Pyc | 3.91 | 3.91 | 3.91 | 3.91 | 3.88 |
| | Helium Pyc | 3.94 | 3.96 | 3.96 | 3.95 | |
| Hardness: | | | 19.6 | 20.1 | 20.4 | 19.6 | 20.7 |
| Avg. Crystal Size: | | | .139 | .135 | .125 | .135 | 0.17 |
| Avg. Aspect Ratio: | | | 4.2:1 | 3.6:1 | 5.1:11 | 8.5:1 | |

Average Grit Diameter was .011–.013" for all 4 samples.

[1]As is - no screening - full range of sizes.
[2]Percent by weight Remainder $Al_2O_3$.

TABLE 5

Comparative Cut and Finish of Abrasive Filaments Against Roll Crushed Grain On 1" Steel Face

| | CUT | | | FINISH | | | | | | | | |
|---|---|---|---|---|---|---|---|---|---|---|---|---|
| | SGC | #952[1] | SGC[1] | SG CONTROL 50 GRIT SURFACE FINISH | | | #952[1] 50 GRIT SURFACE FINISH | | | SG CONTROL[1] 36 GRIT SURFACE FINISH | | |
| TIME INTERVAL No. | 50 GRIT | 50 GRIT | 36 GRIT | | | | | | | | | |
| | ACCUM CUT IN GRAMS | | | Ra | Rtm | Pc | Ra | Rtm | Pc | Ra | Rtm | Pc |
| 1 | 41 | 31 | 44 | 152 | 1053 | 214 | 207 | 1455 | 149 | 226 | 1181 | 163 |
| 5 | 215 | 189 | 256 | 154 | 852 | 195 | 196 | 1279 | 173 | 205 | 1079 | 224 |
| 10 | 438 | 419 | 526 | 119 | 839 | 233 | 158 | 1019 | 179 | 135 | 840 | 177 |
| 15 | 627 | 640 | 779 | 136 | 1018 | 243 | 136 | 714 | 159 | 128 | 711 | 284 |
| 20 | 779 | 859 | 1001 | 63 | 599 | 353 | 124 | 730 | 196 | 129 | 820 | 145 |
| 25 | 880 | 1060 | 1181 | 41 | 420 | 320 | 92 | 581 | 230 | 75 | 526 | 179 |
| 30 | 926 | 1228 | 1334 | 42 | 254 | 100 | 80 | 423 | 152 | 73 | 534 | 181 |
| 35 | — | 1350 | 1437 | — | — | — | 87 | 477 | 139 | 54 | 394 | 168 |
| 40 | — | 1444 | 1506 | — | — | — | 48 | 431 | 200 | 70 | 359 | 181 |
| 44 | — | 1496 | 1541 | — | — | — | 73 | 489 | 96 | 80 | 503 | 115 |
| 48 | — | 1532 | — | — | — | — | 65 | 347 | 90 | — | — | — |

[1]Abrasive filaments.
Ra = DEVIATION FROM MEAN LINE IN MICRONS
Rtm = MEAN PEAK TO VALLEY HEIGHT IN MICRONS
Pc = NUMBER OF PEAKS As can be seen from the above results, the 50 grit abrasive fibers not only out performed the 50 grit roll crushed abrasive grains in cut, the cut was equal to that of the 36 grit control. Again, the abrasive fibers cut at a somewhat lower rate initially than the roll crushed grains; however, it continued to cut at a sustained rate for a longer time. With this 1" steel test, the fiber-shaped abrasive particles generated a finish similar to the 36 grit control.

EXAMPLE 3

Comparative Cut Performance of Abrasive Filaments With Increasing Aspect Ratio Against Roll Crushed Grain In this example, coated abrasive discs with abrasive filaments of different average aspect ratios are tested Fibre-backed abrasive discs were made according to the procedure disclosed in Example 1. The results of the grinding tests, as earlier disclosed, are given in Table 7 below:

TABLE 7

| Disc | Grit | Aspect Ratio | LPD | RESULTS Test 112 Dsh 1020 HR.STL. | Test 112 Dss 304 STN.STL | Test 112 DsIII 1018 STL | Weight of Loss of Discs Test 112 DsIII C/A DISC WEIGHT LOSS | Test 112 Dsh |
| --- | --- | --- | --- | --- | --- | --- | --- | --- |
| SG Control | 50 | 1.4:1 | 180.7 | 705 gms 100% | 48 gms 100% | 180 gms 100% | 0.5 gms 100% | 1.8 gms 100% |
| SG 1015 | 50 | 4.2:1 | 189.2 | 1434 gms 203% | 55 gms 115% | 624 gms 347% | 2.6 gms 520% | 6.2 gms 344% |
| SG 1016 | 50 | 3.6:1 | 197.9 | 1185 gms 168% | 57 gms 119% | 401 gms 223% | 1.5 gms 300% | 3.8 gms 211% |
| SG 1017 | 50 | 5.1:1 | 180.3 | 1617 gms 229% | 56 gms 117% | 465 gms 258% | 2.3 gms 460% | 7.2 gms 400% |
| SG 1018 | 50 | 8.5:1 | 163.9 | 1346 gms 191% | 53 gms 110% | 639 gms 355% | 2.7 gms 540% | 9.5 gms 528% |

The abrasive filaments containing discs, as indicated above, show a marked improvement in cut on the 112 Dsh and 112 DsIII tests on 1020 and 1018 steel, when compared to the roll crushed abrasive grain control disc. By comparison, however, much less of an increase in performance was shown in cutting stainless steel (Test 112 Dss). As in the high pressure dulling test, the abrasive filament containing discs appear to be highly effective in low pressure grinding applications. The as is unscreened (Sample 1015) product had a total cut 347% of the control's cut on the 112 DsIII test.

Figure 7:
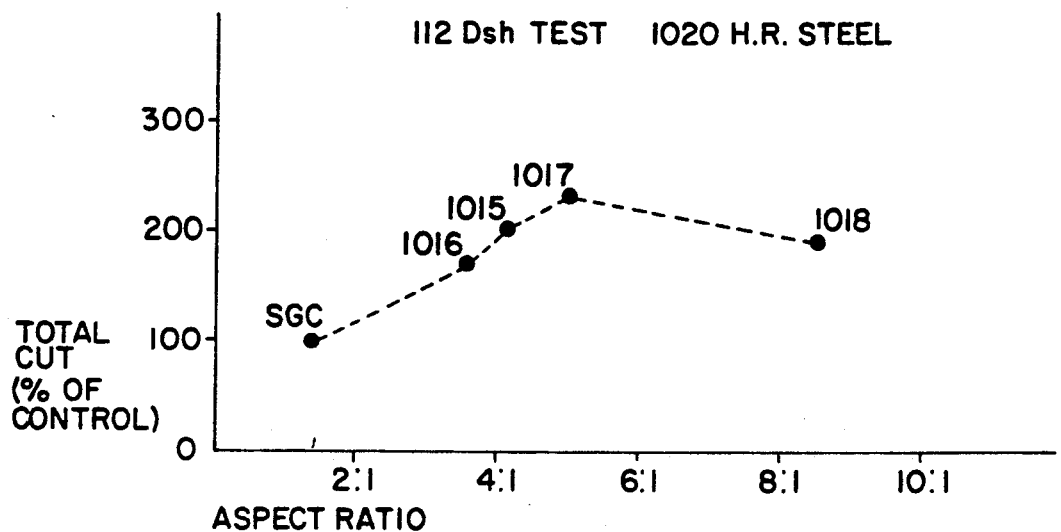
FIG. 7 is a graph showing the effect of increasing aspect ratio on the total cut for coated abrasive discs according to the invention having abrasive filaments.

As shown by FIG. 7 of the drawing, in the 112 Dsh test on 1020 H.R. steel, the cut increases with increasing average aspect ratio up to a point approximately 5.1:1 (Sample 1017) and then decreases. During testing, the abrasive filaments are observed to be broken down and then fly off the fibre disc. While I do not wish to be limited to this explanation, this apparently results from the fact that, as the length of filament increases, the moment arm increases changing the stress levels in the abrasive grain (filaments). The loss of abrasive filaments relative to aspect ratio is confirmed in the above Table 7. Thus, for example, in the 112 Dsh test, the coated abrasive disc weight loss increases with increasing aspect ratio: 9.5gms, with a 8.5:1 ratio versus 3.8gms, with a 3.6:1 average aspect ratio. Nevertheless, as seen in FIG. 7, Sample 1018 in which the aspect ratio averaged 8.5:1 still out performed the control disc having conventional roll crushed grain.

Aspect ratio, as seen in Table 7, does not appear to effect the performance in cutting stainless steel (112 Dss).

Figure 8:
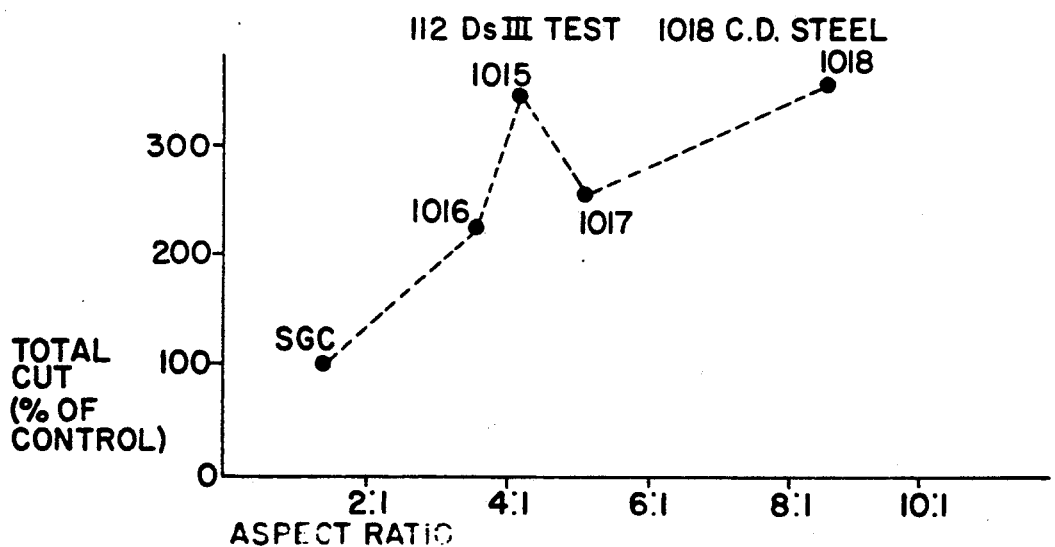
FIG. 8 is another graph showing the effect of the aspect ratio of the abrasive filaments on coated abrasive discs in cutting performance.
Figure 9:
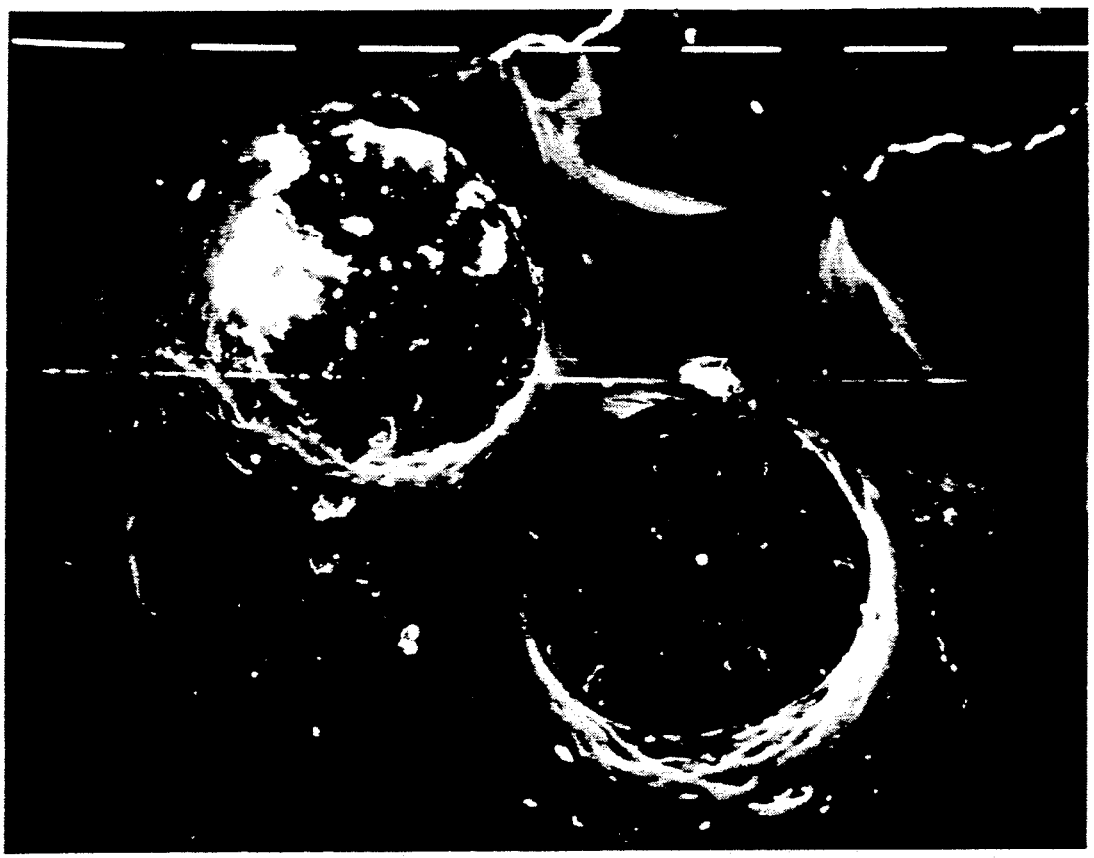
FIG. 9 is an S.E.M. photograph (enlarged 100 times) of the surface of a coated product according to the invention showing the abrasive particles embedded in a size coat.
Figure 10:
FIG. 10 is an S.E.M. 100× photograph of the surface of a conventional crushed seeded sol-gel grain product with a size coat.
Figure 11:
FIG. 11 is a 50× S.E.M. photograph of the swarf from use of a coated product such as that shown in FIG. 9 (product of invention).
Figure 12:
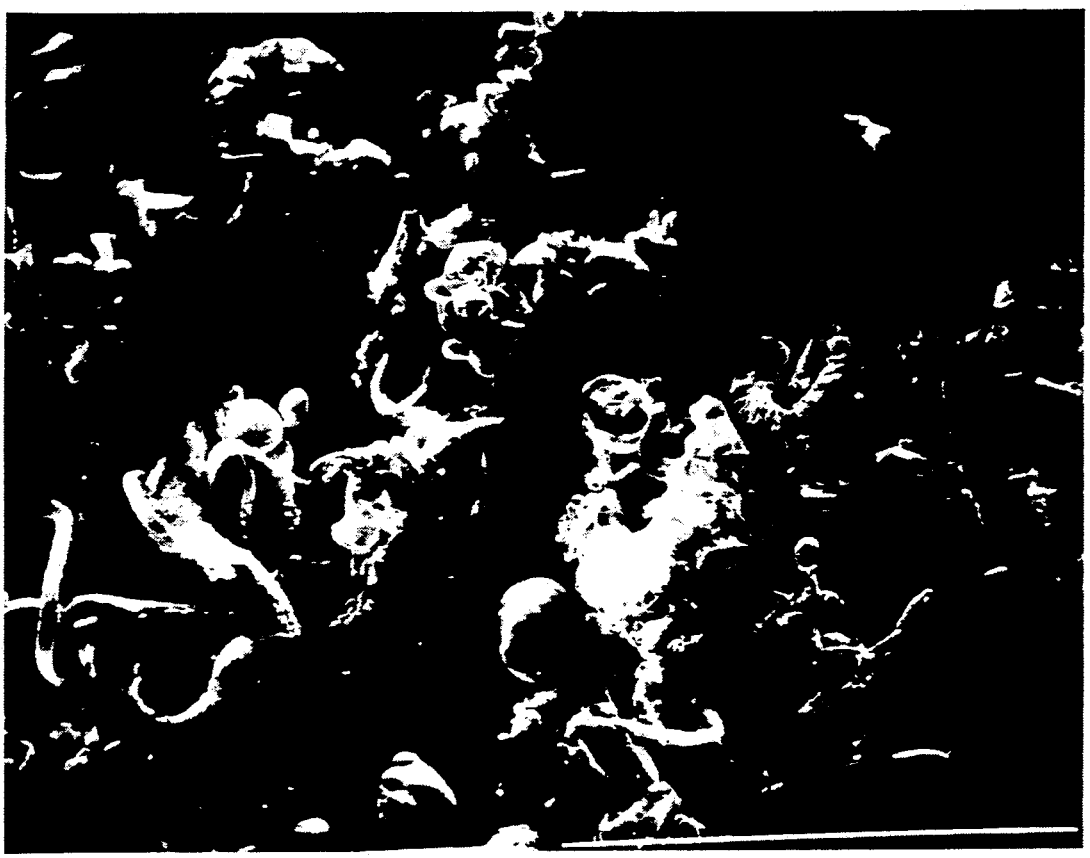
FIG. 12 is a 50× S.E.M. photograph of the swarf from use of the coated product shown in FIG. 10 (Prior Art).

In the case of the low pressure dulling test (112 DsIII), the cut is seen from FIG. 8 to increase with the increasing aspect ratio except for an odd peak in cut with the 4.2:1 aspect ratio or sample 1015. This sample is the only one of the group of samples tested in this Example 3 provided as is, unscreened. A small number (25) of the abrasive filaments were selected at random from sample 1015 and the length and diameter of such were determined optically. The aspect ratio for those filaments varied from 2.58 to 12.66. Thus, it is believed that this difference in cut in 1015 may result from the wider distribution of lengths present in the unscreened sample than in the other samples which were all screened. Screening alters or narrows the distribution of lengths. On the other hand, with unscreened abrasive filaments, a fewer long grains (filaments) are in contact whereby to result in higher unit pressure per grain. Although not specifically shown in Table 7 above, the discs containing abrasive filaments, like in the examples earlier disclosed, have a lower initial cut rate than the SG control, but in each case maintain a higher cut rate for a much longer time. The SG control was cutting 10 gms/min by the 8th interval whereas sample 1015 was cutting higher than 10 gms/min until the 30th interval.

EXAMPLE 4

Cut Performance of 36 Grit Abrasive Filament Discs Against 36 Grit Roll Crushed Grain In this example, a 36 grit fibre disc was evaluated, using seeded sol gel alumina abrasive having the same following composition for manufacture of the abrasive grains by conventional roll crushing and by filament extrusion:

| Component | Weight Percent |
| --- | --- |
| $Al_2O_3$ | 99.52 |
| $Na_2O$ | 0.01 |
| MgO | 0.01 |
| $SiO_2$ | 0.06 |
| CaO | 0.04 |
| $TiO_2$ | 0.19 |
| $Fe_2O_3$ | 0.17 |

The roll crushed abrasive gains and filaments had the following physical properties: Density (Water, Pyc-)—3.89; Density (Helium, Pyc)—3.92; Hardness—20.3; Crystal size (avg.)—0.149 microns.

This abrasive material was extruded at 0.016" diameter (approximately 36 grit) and cut to random lengths varying from about 0.8 mm to about 4 mm. Thus, the aspect ratio of such abrasive filaments (grains) varied from about 2:1 to about 10:1.

Fibre backed discs were manufactured as disclosed in Example 1 except that the coating weights were: maker, 17 lbs./Rm; size coat, 28 lbs./Rm; abrasive grain/fibers, 60 lbs./Rm.

The grading of the abrasive materials used and the resulting cut performance, as before described, are shown in Table 8.

TABLE 8

| Item | Grit | Grade | LPD | Test Results Grams Cut/Time % of Control | | |
|---|---|---|---|---|---|---|
| | | | | 112 Ds 1018 Stl | 112 Dss Stn Stl. | 112 DsIII 3" plate |
| Control | 36 | −0.7 + 13.2 | 185.1 | 1214/100 | 80/100 | 264/100 |
| Abrasive Filaments | 36 | −15.6 + 70.8 | 208.4 | 1842/152 | 91/112 | 465/176 |

In each test performed with the coated abrasive material of the invention, the initial cut rate, as in the earlier tests performed, is lower than the control but the cut rate is maintained for a much longer period. While I do not wish to be held to this theory such low initial cut may be due to the relatively low number of extremely long grains in initial contact.

On the stainless steel test, which is normally run to an end point of 10 minutes, the SG Control was cutting at a rate of six grams per minute and the total cut was 80 grams. At the end of 10 minutes, the discs having abrasive filaments on the other hand was cutting at a rate of 8 grams per minute with a total cut of 91 grams. This fibre disc product was run until a six gram/min. cut rate was reached. Such took an additional 10 minutes run time and the total cut after 20 minutes was 163 grams.

Although the invention has been particularly described with respect to abrasive filaments having an approximately circular-shaped cross-section, it will be appreciated that such is not so limited. The filament-shaped abrasives used in the practice of this invention can be of any cross-sectional shape desired, e.g. round, square, triangular, diamond, polygonal, oval, x-shaped, etc. The main requirement is that such be of an elongated shape as earlier disclosed. Furthermore, such filament-shaped abrasives need not necessarily have a straight configuration. They can be twisted along their lengthwise direction, or otherwise nonlinear, if desired. And coated abrasive sheet material can be manufactured of blends of abrasive filaments having different shapes, or different sizes, e.g., coated abrasive material can be provided with two different diameter round-shaped abrasive filaments. Furthermore, abrasive filaments can be blended with abrasive grains conventionally crushed. Abrasive filaments of sol-gel $Al_2O_3$ can be blended with abrasive grains of other compositions, e.g. fused $Al_2O_3$, garnet, etc. Coated abrasive material can be provided manufactured by conventional split coat techniques, e.g., the make adhesive can be coated followed by application of a cheaper abrasive grain or filler by gravity coat and then electrocoating of the abrasive filaments as disclosed herein. Graded split coat abrasive material can be provided, e.g. by gravity coating of a fine grit first, followed by electrocoating of a more coarse abrasive filament on top.

It will also be appreciated that although the invention has been particularly disclosed with respect to fibre-backed discs, such is not so limited. Various conventional coated abrasive products can be provided, e.g. belts, sheets, shapes and flapwheels.

The foregoing detailed description has been given for clearness of understanding only and no unnecessary limitations are to be understood therefrom. The invention is not limited to the exact details shown and described for obvious modifications and variations will now occur to those skilled in the art without departing from the spirit and scope of the invention a described in the following claims.

What is claimed is:

1. Coated abrasive product comprising:
   a. a backing member; and
   b. a layer of coated abrasive comprising:
      1.) a maker coat; and
      2.) a layer of a plurality of filamentary abrasive particles having a substantially uniform cross-section adhered to said backing member by said maker coat, said abrasive particles each being of a substantially uniform cross-section with an aspect ratio of at least 1:1 and comprising sintered alpha alumina crystals having a size no greater than 2 microns.

2. Coated abrasive product according to claim 1 wherein the said alumina abrasive particles have a density at least about 90% of the theoretical density.

3. Coated abrasive product according to claim 1 wherein the said abrasive particles have a hardness of at least about 14 GPa.

4. Coated abrasive product according to claim 1 wherein the hardness of the said abrasive filaments is at least about 14 GPa.

5. Coated abrasive product according to claim 4 wherein the sintered abrasive filaments have an aspect ratio averaging at least about 2:1 and each abrasive filament has a diameter about 0.013" and said alpha alumina crystals have a size no greater than about 1 micron.

6. Coated abrasive product according to claim 5 wherein at least 80% of said filament shaped alumina abrasive particles appears as generally equived crystals having a size no greater than about 0.4 microns.

7. Coated abrasive product according to claim 1 wherein the said preshaped abrasive particles are abrasive filaments having a density at least 95% of the theoretical density, and includes from up to 15% by weight of a member selected from the group consisting of spinel, mullite, manganese dioxide, titania, magnesia, ceria, zirconia, precursors of said oxides, and mixtures thereof.

8. Coated abrasive product according to claim 7 wherein said alpha alumina crystals are seeded alpha alumina crystals having a size of less than 1 micron.

9. Coated abrasive product according to claim 6 wherein at least some of the said filament shaped alumina based abrasive particles are curved in their longer dimension.

10. Coated abrasive product according to claim 6 wherein at least some of the said abrasive filaments are twisted in their longer dimension.

11. Coated abrasive product according to claim 1 wherein the said preshaped abrasive particles are abrasive filaments of circular-shape, each said filament having a diameter of approximately 0.013".

12. Coated abrasive product according to claim 11 wherein the said abrasive filaments have an aspect ratio averaging at least about 2:1.

13. Coated abrasive product comprising a backing member, a maker coat on said backing member, a layer of abrasive filaments adhered at an end of said filaments to said backing member by said maker coat with at least the greater proportion of said filaments extending generally away from said backing member and a size coat over-laying said abrasive filaments.

14. Coated abrasive product according to claim 13 wherein said abrasive filaments comprise polycrystalline aluminum oxide based on a seeded sol gel.

15. Coated abrasive product according to claim 14 wherein the maker and size coats comprise a phenolic resin.

16. Coated abrasive product according to claim 15 wherein the abrasive filaments have an aspect ratio averaging at least about 2:1.

17. Coated abrasive product according to claim 16 wherein the abrasive filaments are circular shape in cross-section.

18. Coated abrasive product according to claim 17 wherein the abrasive product is a disc and the backing member is vulcanized fibre.

19. Coated abrasive product according to claim 17 wherein the abrasive filaments have an average aspect ratio of at least about 5.1:1.

20. Coated abrasive product according to claim 17 wherein the abrasive filaments have a diameter approximately 0.013" and a hardness of at least about 19.

21. Coated abrasive product according to claim 1 in which the abrasive particles have a filamentary shape and in which at least one end of each filament is adhered to the backing member, with the greater proportion of the filaments extending generally away from the backing member.

* * * * *

UNITED STATES PATENT AND TRADEMARK OFFICE
CERTIFICATE OF CORRECTION

PATENT NO. : 5,103,598
DATED     : April 14, 1992
INVENTOR(S) : Robert G. Kelly

It is certified that error appears in the above-indentified patent and that said Letters Patent is hereby corrected as shown below:

Column 20, line 63, delete "preshaped".

Signed and Sealed this

Eighteenth Day of April, 1995

Attest:

BRUCE LEHMAN

Attesting Officer

Commissioner of Patents and Trademarks